Figure 1:
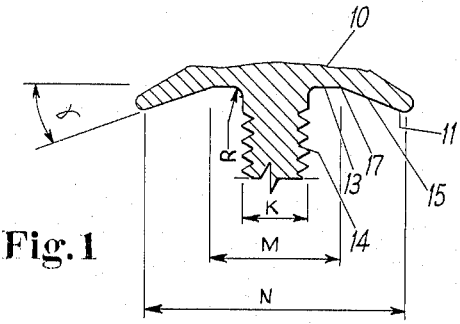

March 22, 1966   J. G. HEIMOVICS   3,241,422
VECTOR SEAL FASTENER

Filed March 6, 1963   2 Sheets-Sheet 1

INVENTOR.
JOHN G. HEIMOVICS,
BY
Yungblut, Melville, Strasser & Foster
ATTORNEYS.

March 22, 1966     J. G. HEIMOVICS     3,241,422
VECTOR SEAL FASTENER

Filed March 6, 1963     2 Sheets-Sheet 2

INVENTOR.
JOHN G. HEIMOVICS,
BY
*Yungblut, Melville, Strauser & Foster*
ATTORNEYS.

United States Patent Office 3,241,422
Patented Mar. 22, 1966

3,241,422
VECTOR SEAL FASTENER
John G. Heimovics, Kansas City, Mo., assignor to Armco Steel Corporation, Middletown, Ohio, a corporation of Ohio
Filed Mar. 6, 1963, Ser. No. 263,250
1 Claim. (Cl. 85—9)

This invention resides in a novel fastener, such as a bolt or screw, having a unique configuration imparted to the head thereof, particularly the underside of such head.

Bolts and screws, of course, have been known to mankind for many years. Various configurations have been given the heads of these items. Nevertheless defects do exist. One problem which frequently arises is that, when using a resilient type washer, as in applications involving sealing actions in addition to holding requirements, the washer material, when the bolt or screw is tightened down thereon, is partially or totally forced out from underneath the bolt or screw head. When constructing roofs, side walls, grain bins, tanks and the like, this means leaky joints, obviously a very undesirable situation. And this also means unsightly work. Furthermore, it is often desirable for the washer to separate the bolt or screw head physically from the material that is fastened together and this often does not occur with bolts and screws heretofore known wherein the washer is spread away from the shank rather than bunched together about the shank by action of the head which contacts it.

A very important object of this invention is to provide a bolt or screw having a head which will engage a washer or like article in such manner as to force the washer to the center, that is, towards the shank of the screw or bolt.

Another important object of this invention is to provide a fastener which will give an excellent seal.

A further object of the invention is to provide a fastener which presents a neat appearance when in place.

Another object of this invention is to provide a fastener which will cooperate with an ordinary non-metallic washer in such manner that, in situations wherein the fastener is applied to metal, the fastener head will be separated from the material that is fastened together so as to prevent metal-to-metal contact whereby to eliminate electrolytic corrosion action between the fastener head and material fastened.

Another object of this invention is to provide a fastener which produces a high degree of tightening efficiency of applied torque.

Figure 2:
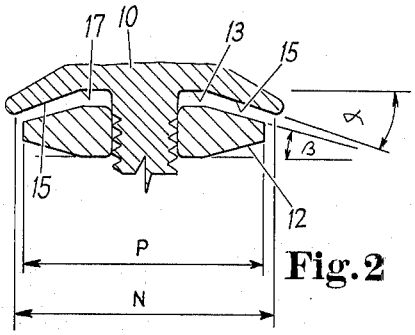
Figure 3:
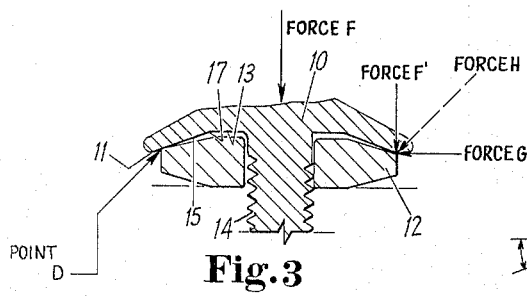
Figure 4:
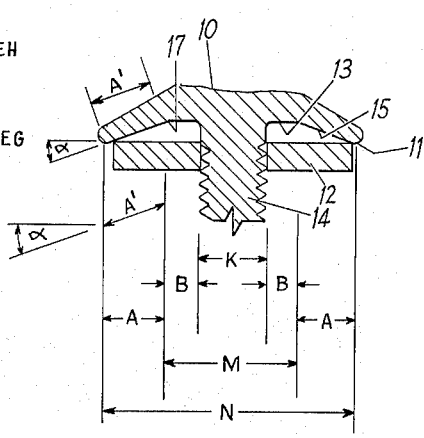
Figures 5, 6:
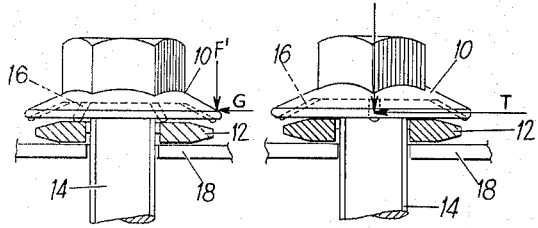
Figure 7:
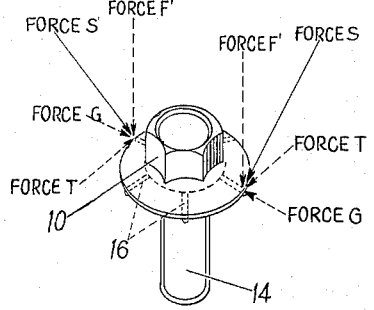
Figure 8:
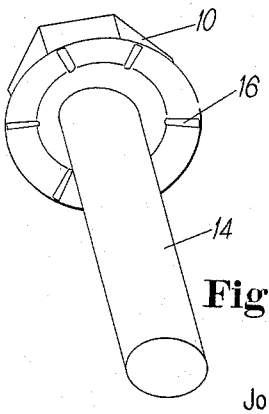
Figure 9:
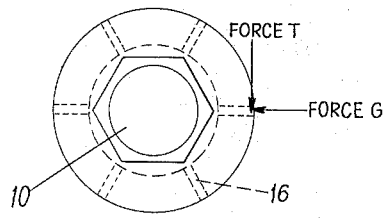
Figure 10:
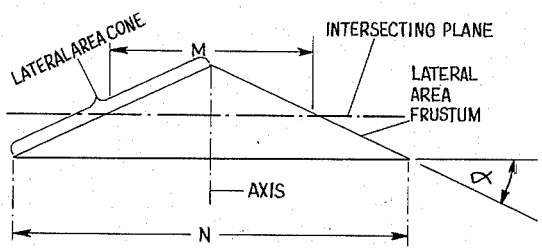
Figure 11:
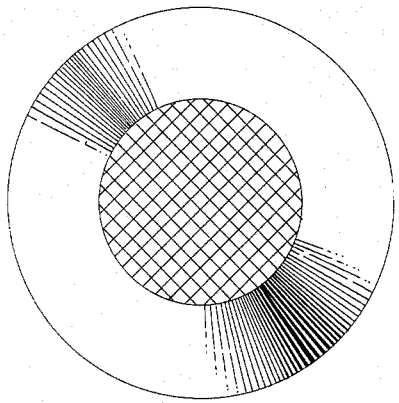
Figure 12:
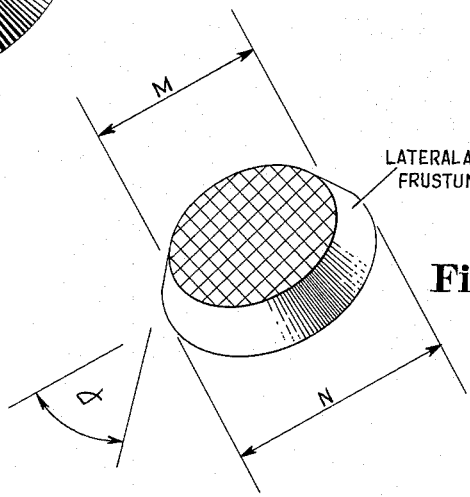

These and other objects of the invention will become apparent to those skilled in the art from the description to follow, keeping the foregoing remarks in mind, and with reference to the accompanying drawings wherein like numerals are employed to designate like parts and wherein:

FIGURE 1 is a fragmentary section of a typical fastener embodied in the invention, such fastener preferably being either a bolt or screw having the head as shown (see also FIG. 5) and as will be described in detail in the specification to follow, FIGURE 2 is a fragmentary section of the fastener of this invention shown with a typical washer under the head thereof, FIGURE 3 is a view similar to FIGURE 2 differing therefrom in that the fastener head is shown as it makes initial contact with the washer, FIGURE 4 is a fragmentary section of the novel fastener as employed with a washer having a flat upper surface, the bottom of the washer having no restrictive shape, and diagrammatically illustrating other features pertaining to the fastener head construction, FIGURE 5 is a fragmentary front elevation of a modified form of fastener of this invention;

FIGURE 6 is a view similar to FIGURE 5 but diagrammatically illustrating the application of certain forces via the head to the washer, FIGURE 7 is a perspective view of the modified fastener of FIGURE 5 again diagrammatically illustrating certain forces involved, FIGURE 8 is another perspective view of the modified fastener of FIGURE 5, FIGURE 9 is a top plan view of the fastener shown in FIGURE 5, FIGURE 10 is a front elevation of a right circular cone used to represent diagrammatically the surface under the head of the fastener, FIGURE 11 is a top plan view of a frustum of the right circular cone of FIGURE 10, and FIGURE 12 is a perspective view of the frustum of FIGURE 11.

Although the invention has been shown as embodied in screws having heads of various shapes, note for example the hex head type screw of FIGURES 5 through 9, this has been done for convenience only and should not be construed as a limitation; the fastener could just as well have a round head, or other shaped head, with or without a slot therein.

Referring now to the FIGURES 1 through 4 the invention will be described as applied to the head of an otherwise conventional bolt or screw. An important feature of this head 10 is that the outer diameter 11, of the surface 15, or substantially so, will make the initial contact with the outer diameter of the washer 12 beneath the head. This, however, is not the only requirement. Certain other configurations have been found to be necessary and these will now be described.

It is very important that there be a small flat portion 13 immediately adjacent, and perpendicular to, the shank of the fastener on the underside of the head 10. This flat must join the shank by a small curvature, a curvature that is somewhat greater than what would occur merely as a result of normal manufacturing or marking. This small curvature is indicated as having a radius R. In FIGURE 1 the maximum diameter of surface 15 of the head 10 is indicated by the letter N. The diameter of flat 13 is indicated by the letter M. The diameter of the shank 14 is indicated by the letter K. Also, referring to FIGURE 4, the distance from the outer diameter of surface 15 of the head 10 to the outer diameter of the flat 13 is indicated by the letter A, while the distance between the outer diameter of the flat 13 and the shank 14 is indicated by the letter B. And, referring to FIGURES 1 and 2, the underside of the head 10 will be a right conic surface depression having the sloping surface 15 which has an angle of alpha with the horizontal. These terms and configurations will be described in greater detail shortly. The upper surface of the washer 12 may be flat as indicated in FIGURE 4 or it may be wedge shaped as indicated in FIGURES 2 and 3; when the washer is wedge shaped a portion, at least, of the upper surface thereof will have an angle beta with the horizontal.

FIGURES 10 through 12 show a right circular cone and frustum thereof. FIGURE 10 shows a right circular cone with one intersecting plane perpendicular to the axis and parallel (horizontal) to the base of the cone. This plane forms a frustum of a right circular cone having a top circular diameter M, a base circular diameter N, and an angle of slope alpha. This sloping surface of the cone is defined as the lateral area cone. The sloping surface of the frustum formed is defined as the lateral area frustum. FIGURE 12 shows the frustum of said cone and the lateral area frustum is defined as a right conic surface; this surface is the same as surface 15 in FIGURES 1 and 2. (Similarly, the dimensions M, N and alpha of FIGURES 10 through 12 correspond to these same designations in FIGURES 1, 2 and 4.) The shape of the cavity created by this surface is defined as a right conic surface depression.

There is a definite relationship among the various structures so far defined; these will be now be set forth precisely. The underside of the head 10 must have the flat 13 perpendicular to the shank 14 and the head must also have a slope 15 defining the angle alpha with the horizontal. The diameter M must always be at least equal to, and preferably greater than, the sum of the diameter K plus twice the radius R of the curvature joining the flat 13 with the shank 14. In those instances wherein the head 10 is employed with a washer 12 having a wedge shaped surface, the angle alpha hereinbefore described must be greater than the angle beta also previously described. This latter relationship is clearly shown in FIGURE 2. And, the true length of A′, see FIGURE 4, the projected surface 15 of FIGURES 1 and 2, must be equal to or greater than B which is surface 13.

It has been determined that when a fastener head is constructed according to the foregoing teachings and employed with an ordinary non-metallic washer of the type which would normally be used with a fastener head of a given size, namely, a washer 12 which will have an outside diameter P, FIGURE 2, something less than the outside diameter N of surface 15, an exceptionally good seal is achieved. This is further illustrated in FIGURE 3. This figure shows the force F being created by the tightening action of the screw or bolt. This force F is translated to the underside, surface 15, of the head 10 between points 11 and 17, contacting the washer 12 at point D located at the outer diameter P of the washer 12 and thus becoming a multitude of smaller forces, noted as force F′. The horizontal component of force F′ is force G. The resultant of these two forces is force H. The interaction of these forces simultaneously creates a downward and inward pressure against the washer 12.

A prime requisite of the invention, in order for the fastener to achieve the much improved seal, is that the first point of contact between the fastener head 10 along surface 15 and the outside diameter of the washer 12 is, as indicated, at point D in FIGURE 3.

A fastener head designed as taught herein achieves a mechanical advantage through the simple vector forces illustrated, and these keep the washer from squirting out from under the fastener head. This obviously is a very desirable result. By thus keeping the washer clutched about the shank beneath the head, the bolt head is physically separated from the material that is held and this, when metals are fastened together, prevents metal-to-metal contact between the bolt head and the fastened material, thereby preventing any electrolytic action which would otherwise occur.

In addition, the resultant vector forces indicated in FIGURE 3 cause the washer 12 to be forced into the center, thereby providing a tight, leak-proof seal.

Normally the washers with which this fastener will be employed are made from vinyl, nylon, neoprene or like substance and the washer will have an outside diameter slightly less than the outside diameter of the fastener head. These same vector forces insure that the washer will not squirt out from underneath the fastener head when it is tightened down as a consequence of which a nicer appearing finished job is obtained. Furthermore, also due to the vector forces first acting along surface 15 and the outside diameter of the washer, a certain degree of pre-stress is established which creates a better resistance to shock and vibration through triangular relationship at the bearing points.

A modification of the invention is illustrated in FIGURES 5 through 9. In considering this modification, however, it is to be understood that the various relationships among the structures heretofore described will also obtain in the modified fastener. This modification differs from the basic fastener of FIGURES 1 through 4 in the addition of a plurality of embossed radial projections 16 on the right conic surface 15 of head 10 and extending radially thereof. These embossed radial projections 16 are generally semi-cylindrical in shape and, therefore, are defined for the purpose of this description as embossed radially extending semi-cylindrical protuberances.

It has been determined that the added features of these embossed radially extending semi-cylindrical protuberances 16 increase the holding power of the fastener when employed with the more or less ordinary washer 12. The embossed radially extending semicylindrical protuberances 16 on the right conic surface 15 have permuted the two dimensional force components of force F, FIGURE 3, to three dimensional force components F′, G and T; see FIGURES 5, 9, 6 and 7. The new resultant of these forces is force S. FIGURE 7 attempts to illustrate the three dimensional forces and their resultant in a single view. Better results are achieved with the modification shown in FIGURES 5 through 9 wherein the novel fastener of FIGURES 1 through 4 is provided with the embossed radially extending semi-cylindrical protuberances 16 on the right conic surface 15.

The addition of the small semi-cylindrical radial projections 16, preferably 2 or more in number (for clarity of drawings in FIGURES 5 through 9, six radial protuberances are shown) on the underside of the angular portion of the head face 15 provides a higher efficiency of tightening torque of the fastener-washer combination. It is believed that this physical phenomenon can be explained as follows. When the underside of the fastener head and the upper side of the material 18 being fastened are both relatively smooth, there are low coefficients of friction of these two surfaces and there are two surfaces for slippage of the washer; this is inherent. After the fastener is tightened, the washer attempts to relieve some of the shear force applied to it. The two smooth surfaces allow a small degree of slippage. The modification of FIGURES 5 through 9, including the radial projections 16 as described, greatly increases the coefficient of friction between the underside of the fastener head and the washer itself. This tends to eliminate one surface of slippage by sustaining a shear force on one surface. This works in reverse when tightening so that the washer is held tighter because there is less force wasted by the friction force component.

The efficiency of tightening torque is obtained by driving a screw into a piece of metal with a known amount of torque input delivered by a screw gun or similar device. The holding power of the screw is then checked with a torque wrench or torque testing device. The point at which the screw starts to move is the holding power of the screw. The formula for percent efficiency of screw is as follows:

$$\frac{\text{Screw torque (torque wrench)}}{\text{Input torque (screw gun)}} \times 100 = \text{percent efficiency}$$

Tests on this new improved fastener show that because the vector forces do force more washer material, of a given size washer, in around the shank and under the head, it takes more force to loosen these improved fasteners in a given assembly. Loosening due to vibrations caused by wind, movement of cranes in buildings etc. is resisted with increased strength. The tendency of fasteners to worn loose in building panels and fall out is greatly reduced when they are manufactured according to the teachings of this invention. When, by way of example, a fastener having the radial projections 16 is employed with a specific material having the proper size hole and using the proper size washer, and the head is tightened down thereon, a minimum tightening efficiency of 60% of input torque is realized.

It is believed that the invention has been fully described in the foregoing passages. It is to be understood that while the novel fastener has been described as applying primarily to the head of a bolt or screw and as embodied in certain structures, these structures are not to constitute a limitation on the invention except insofar as they are specifically set forth in the subjoined claim. It is probable that modifications may be made in this invention by those skilled in the art without departing from the scope and spirit thereof.

Having thus described the invention, what is claimed as new and what is desired to be protected by United States Letters Patent is:

In combination, a fastener and a washer, the fastener having a head and a shank, the effective underside of said head being generally a right conic surface depression, a portion of said head underside adjacent said shank being flat and perpendicular to said shank, said flat and said shank being joined by a curvature of small radius, the minimum diameter of said flat being at least slightly greater than the diameter of said shank plus twice said radius, the true length projected distance of the right conic surface depression from the outer edge of said flat to the outer edge of said head being greater than the distance from the outer edge of said flat to said shank, the outside diameter of the right conic surface depression of said head being larger than the outside diameter of said washer, the angle of the head underside with the horizontal being larger than the angle, if any, of the top side of the washer with the horizontal, whereby when said head is tightened down on said washer the outside diameter of said head will make the initial contact with said washer at the outside diameter thereof and said washer will be squeezed towards said shank, and radially extending ribs on the right conic surface depression portion of the head underside, said ribs extending into said washer a relatively small amount when said head is tightened down, said washer being comprised of a resilient non-metallic material, and the volume of said washer being greater than that defined by said right conic surface depression, whereby the head is prevented from contacting the surface beneath said washer when said head is tightened down.

References Cited by the Examiner

UNITED STATES PATENTS

| 316,619 | 4/1885 | Hayes | 85—9 |
| 641,956 | 1/1900 | Hart | 85—9 |
| 2,449,846 | 9/1948 | Gilman | 151—38 |
| 2,531,048 | 11/1950 | Huck. | |
| 2,995,057 | 8/1961 | Nenzell | 85—9 |
| 3,087,370 | 4/1963 | Laia | 85—9 |

FOREIGN PATENTS

| 659,486 | 10/1951 | Great Britain. |
| 690,269 | 4/1953 | Great Britain. |

EDWARD C. ALLEN, *Primary Examiner.*